US008126765B2

(12) United States Patent
Dube et al.

(10) Patent No.: US 8,126,765 B2
(45) Date of Patent: Feb. 28, 2012

(54) MARKET DEMAND ESTIMATION METHOD, SYSTEM, AND APPARATUS

(75) Inventors: Parijat Dube, Yorktown Heights, NY (US); Honghui Xia, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/968,739

(22) Filed: Jan. 3, 2008

(65) Prior Publication Data

US 2009/0177521 A1  Jul. 9, 2009

(51) Int. Cl.
*G06F 17/00* (2006.01)
(52) U.S. Cl. ..................................... 705/7.31
(58) Field of Classification Search .................. 705/7.31
See application file for complete search history.

(56) References Cited

U.S. PATENT DOCUMENTS

| 6,519,571 | B1 | 2/2003 | Guheen et al. |
| 6,539,392 | B1 | 3/2003 | Rebane |
| 2005/0055275 | A1* | 3/2005 | Newman et al. ................ 705/14 |

OTHER PUBLICATIONS 2.997 Decision-Making in Large-Scale Systems, Lecture Note 1, Massachusetts Institute of Technology, http://ocw.mit.edu/OcwWeb/Mechanical-Engineering/2-997Spring2004/CourseHome/index.htm, Feb. 2004.
2.997 Decision-Making in Large-Scale Systems, Lecture Note 2, Massachusetts Institute of Technology, http://ocw.mit.edu/OcwWeb/Mechanical-Engineering/2-997Spring2004/CourseHome/index.htm, Feb. 2004.
2.997 Decision-Making in Large-Scale Systems, Lecture Note 3, Massachusetts Institute of Technology, http://ocw.mit.edu/OcwWeb/Mechanical-Engineering/2-997Spring2004/CourseHome/index.htm, Feb. 2004.
2.997 Decision-Making in Large-Scale Systems, Lecture Note 4, Massachusetts Institute of Technology, http://ocw.mit.edu/OcwWeb/Mechanical-Engineering/2-997Spring2004/CourseHome/index.htm, Feb. 2004.
2.997 Decision-Making in Large-Scale Systems, Lecture Note 5, Massachusetts Institute of Technology, http://ocw.mit.edu/OcwWeb/Mechanical-Engineering/2-997Spring2004/CourseHome/index.htm, Feb. 2004.
2.997 Decision-Making in Large-Scale Systems, Lecture Note 6, Massachusetts Institute of Technology, http://ocw.mit.edu/OcwWeb/Mechanical-Engineering/2-997Spring2004/CourseHome/index.htm, Feb. 2004.
2.997 Decision-Making in Large-Scale Systems, Lecture Note 7, Massachusetts Institute of Technology, http://ocw.mit.edu/OcwWeb/Mechanical-Engineering/2-997Spring2004/CourseHome/index.htm, Feb. 2004.

(Continued)

*Primary Examiner* — Thomas Dixon
(74) *Attorney, Agent, or Firm* — Cantor Colburn LLP; William J. Stock (57) ABSTRACT

A method to estimate demand of a market for a service is disclosed. The method includes selecting a set of feasible service offerings to offer for sale to the market from a set of candidate service offerings, observing a response of the market to the set of feasible service offerings offered for sale, and estimating a demand of the market for the service based upon the observed response. Each service offering of the set of feasible service offerings and the set of candidate service offerings is defined by a price and a service level.

18 Claims, 5 Drawing Sheets

OTHER PUBLICATIONS 2.997 Decision-Making in Large-Scale Systems, Lecture Note 8, Massachusetts Institute of Technology, http://ocw.mit.edu/OcwWeb/Mechanical-Engineering/2-997Spring2004/CourseHome/index.htm, Feb. 2004.

2.997 Decision-Making in Large-Scale Systems, Lecture Note 9, Massachusetts Institute of Technology, http://ocw.mit.edu/OcwWeb/Mechanical-Engineering/2-997Spring2004/CourseHome/index.htm, Feb. 2004.

2.997 Decision-Making in Large-Scale Systems, Lecture Note 10, Massachusetts Institute of Technology, http://ocw.mit.edu/OcwWeb/Mechanical-Engineering/2-997Spring2004/CourseHome/index.htm, Feb. 2004.

"Introduction to Queueing Theory", MIT Lecture Notes, Course 6.263J/16.37J Data Communication, http://ocw.mit.edu/OcwWeb/Electrical-Engineering-and-Computer-Science/6-263JData-Communication-NetworksFall2002/CourseHome/index.htm, 2002.

"On the Value of Learning for Bernoulli Bandits with Unknown Parameters", Sandjai Bhulai and Ger Koole, IEEE Transactions on Automatic Control 45:2135-2140, 2000.

"Multi-Armed Bandits in Discrete and Continuous Time", Haya Kaspi and Avishai Mandelbaum, The Annals of Applied Probability, vol. 8, No. 4, 1270-1290, 1998.

* cited by examiner

MARKET DEMAND ESTIMATION METHOD, SYSTEM, AND APPARATUS

BACKGROUND OF THE INVENTION

1. Field of the Invention

This invention relates to market demand estimation, and particularly to estimation of demand for information technology (IT) services.

2. Description of Background

In IT services markets, demand for a service offering is generally governed by a price and quality of the service offering. Customers have different profiles and respond differently to price and quality or levels of service offerings. The level of service offering that a firm can offer depends upon its capacity and the demand. Demand variability due to changing market conditions can be high and firms often need to act quickly to maintain a level of capacity sufficient to provide a level of service offering to which they have committed. Therefore, there is an interdependence between demand, price, quality of service, and capacity. Accordingly, decisions regarding service, pricing and capacity planning are intertwined.

An objective of pricing decisions is to set a price associated with a service level to achieve business objectives or goals, such as revenue increase and customer base expansion for example. An objective of capacity planning decisions is to maintain a level of capacity to meet service level agreements. Both capacity planning and pricing decisions require knowledge of demand.

In an on-demand market paradigm, the demand for a specific service level is uncertain because customers have the flexibility to select and pay for services as and when needed, without any long-term fixed cost obligation. IT services markets are particularly uncertain because firms are constantly exploring markets for new services and experimenting with different service offerings.

Present approaches estimate demand as a function only of price and can be classified as exploratory and non-exploratory. The exploratory and non-exploratory approaches can be further classified as parametric or non-parametric. Parametric approaches model demand distribution using some known family of probability distribution function and estimate the unknown parameters of the demand distribution. Non-parametric approaches estimate the empirical distribution of demand. Both parametric and non parametric approaches can update the estimated quantities in a static or dynamic manner.

Non-exploratory approaches for demand estimation are typically suited for products that are well established in the markets and have demand that is predictable from historical data. For products having demand with volatility, such as subject to fluctuations of changing market conditions for example, non-exploratory approaches may fail to perform well.

Exploratory approaches include firm experimentation with different service offerings to simultaneously learn the demand while doing business. A typical exploratory approach includes setting a price, and observing customer response to this price. The observation is used to update knowledge about the unknown demand. However, this requires offering each of the different price levels a sufficient number of times so as to get a close estimate of a curve that describes the demand. The drawback of such approaches is that the demand learning is at the expense of foregone profits. Further, these approaches lack interaction of service quality, are not scalable, and are time consuming. Accordingly, there is a need in the art for a demand estimation arrangement that overcomes these drawbacks.

SUMMARY OF THE INVENTION

An embodiment of the invention includes a method to estimate demand of a market for a service. The method includes selecting a set of feasible service offerings to offer for sale to the market from a set of candidate service offerings, observing a response of the market to the set of feasible service offerings offered for sale, and estimating a demand of the market for the service based upon the observed response. Each service offering of the set of feasible service offerings and the set of candidate service offerings is defined by a price and a service level.

A further embodiment of the invention includes a system for estimating demand of a market for a service. The system includes processing, display, storage, input and output resources for executing machine readable instructions stored in the storage; the machine readable instructions for selecting a set of feasible service offerings to offer for sale to the market from a set of candidate service offerings, observing a response of the market to the offered set of feasible service offerings, and estimating a demand of the market for the service based upon the observed response. Each service offering of the set of feasible service offerings and the set of candidate service offerings is defined by a price and a service level.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides an estimate including service price and quality of market demand thereby allowing enhanced price and capacity planning decisions to increase business objectives, such as revenue growth and customer expansion, for example.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An embodiment of the invention provides a demand estimation arrangement for IT services as a function of both price and quality of service. Such demand estimation is an integral component of capacity planning and pricing for IT services to obtain business objectives under uncertain demand. A further embodiment includes the interdependence between demand, price, quality of service and capacity.

An embodiment includes a demand learning phase and a decision phase. The demand learning phase quantifies demand as a function of both price and quality (service level) by experimenting with different service offerings and using analytical models to link the capacity with price, service level and demand. Each service offering is identified by a tuple or vector of factors to evaluate, such as a price and service level grouping for example. The demand learning phase includes a series of decision points, at each of which the firm decides on the set of service offerings to experiment with in the subsequent interval. At the end of each interval there is another decision point.

The decision phase occurs when the firm decides to stop experimenting with different service offerings and select the price and quality offering to best meet the business objectives based upon the demand learned from the demand learning phase. Accordingly, the decision phase follows the demand learning phase that has enough iteration to provide sufficient confidence about demand for different feasible service offerings. The firm may also make appropriate capacity planning decisions at this phase. In an embodiment, the demand learning phase and decision phase can be implemented in an iterative manner resulting in dynamic pricing and capacity planning.

Figure 1:
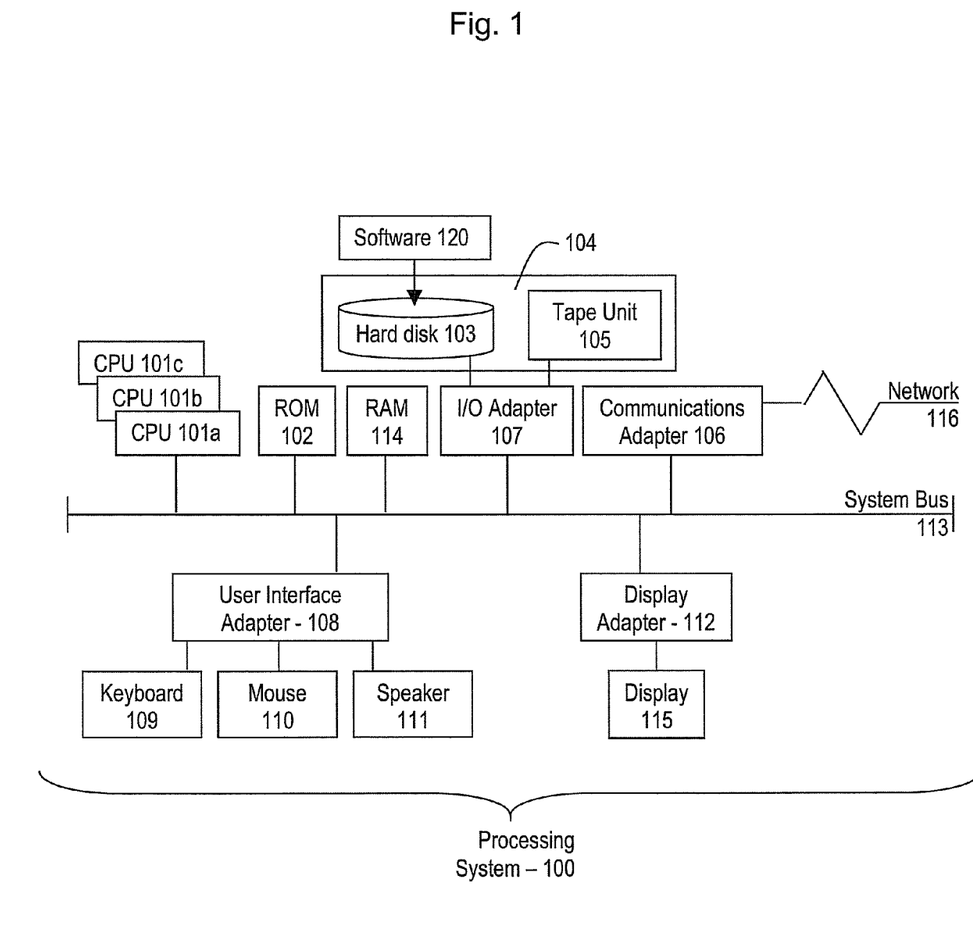
FIG. 1 illustrates one example of an infrastructure for operation of a demand estimation system in accordance with an embodiment of the invention.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes the network adapter or interface 106 for communicating over the network 116. The network 116 can be a local-area network (LAN), a metro-area network (MAN), or wide-area network (WAN), such as the Internet or World Wide Web.

Users of the system 100 can connect to the network 116 through any suitable network interface 106 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the hard disk 103) for capture and interactive display of information shown on the screen 115 of a user. As discussed herein, the instructions are referred to as "software" 120. The software 120 may be produced using software development tools as are known in the art. Also discussed herein, the software 120 may also be referred to as a "demand estimation tool" 120 or other similar terms. The software 120 may include various tools and features for providing user interaction capabilities as are known in the art.

Figure 2:
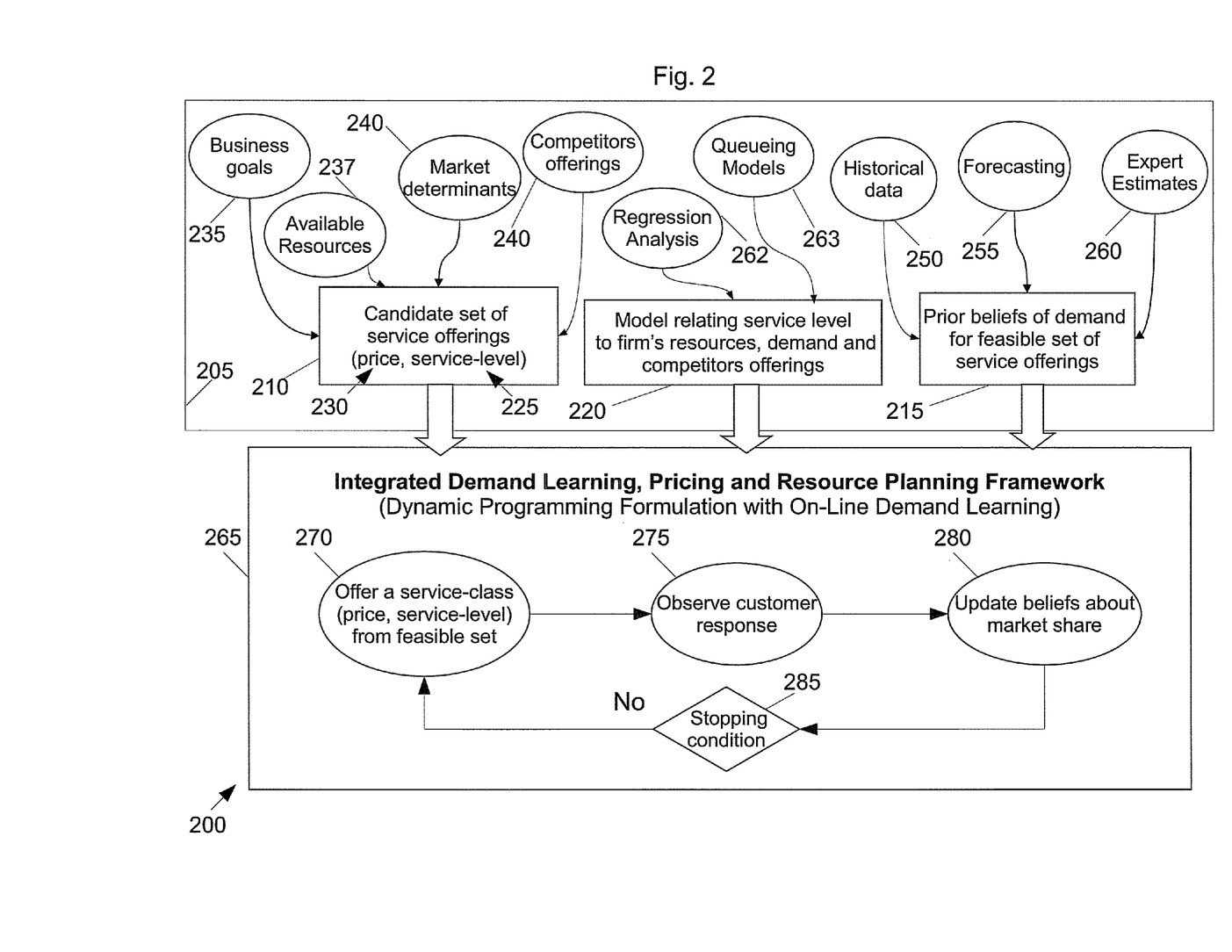
FIG. 2 illustrates one example of a collaboration diagram representing a demand estimation process in accordance with an embodiment of the invention.

FIG. 2 depicts a collaboration diagram representing an embodiment of a demand estimation process 200.

Inputs 205 include a candidate set of offerings 210, prior beliefs about demand 215 and a service model 220.

The candidate set of service offerings 210 is reduced, or pruned to a subset of feasible service offerings 310 (FIG. 3) for a market in which the company wants to operate, as will be described further below. In an embodiment, the candidate set of service offerings 210 has elements of the form (price, service level). A service level 225 represents the set of all factors, apart from a price 230 of service, characterizing the quality of the offered service, which can affect a user decision to take service from one of a plurality of different service providers. Examples of factors that influence the service level 225 include business goals of the company 235, available resources 237 owned by the company, market determinants 240, and competitors' service offerings 245.

Prior beliefs 215 or knowledge about demand corresponding to different feasible service offerings are estimated. This can be done using historical data 250 corresponding to past observed demand. Further, processing of the historical data 250 may be accomplished using one or both of demand forecasting techniques 255 and expert opinions 260.

The service model 220 utilizes statistical and analytical techniques to describe interdependency between demand, the set of candidate service offerings 210, competitors' service offerings 245 and available resources 237. Examples of appropriate statistical and analytical techniques include regression analysis 262, and queuing models 263.

Figure 3:
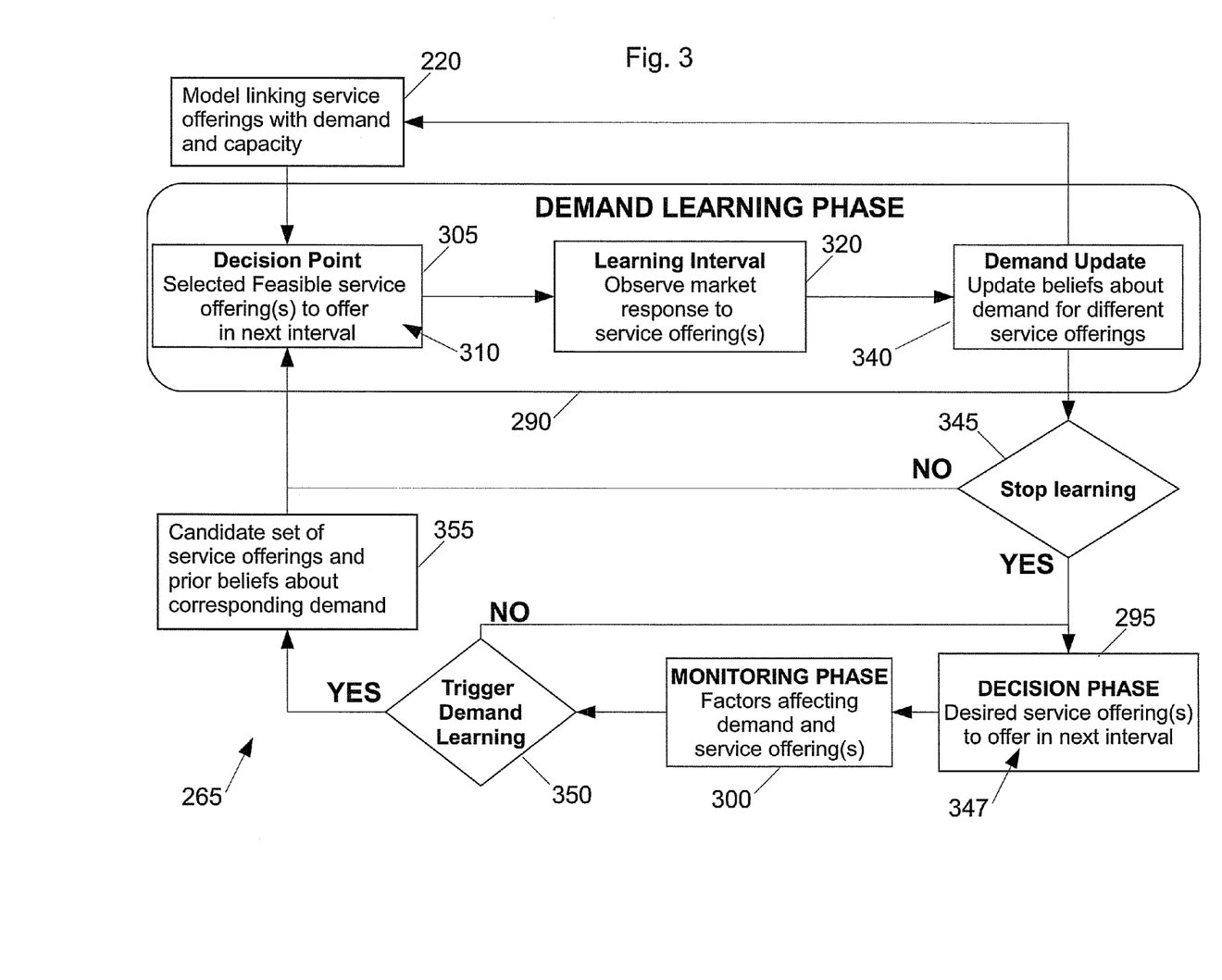
FIG. 3 illustrates one example of an expanded view of an integrated demand learning, pricing, and resource planning framework in accordance with an embodiment of the invention.

The inputs 205 are provided to an integrated demand-learning, pricing and resource planning framework 265. A broad illustration of the framework 265 includes offering for sale 270 to the market a service-class tuple (one of the price and service-level(s) groupings) from the feasible set of service offerings 310, observing a customer response 275 to the offering, and updating beliefs 280 about market share. At decision block 285 the process determines whether additional iterations of offering 270, observing 275, and updating 280 are required. If so, the process continues. Alternatively, if following the updating 280, the process determines that the additional learning is not required, the decision block 285 represents a stopping condition, and the information gained by the learning may be used to select an appropriate service class to further the business objectives.

FIG. 3 depicts an expanded view of the framework 265. The framework 265 broadly includes a demand learning phase 290, a decision phase 295, and a monitoring phase 300.

An objective of the demand learning phase 290 is to efficiently explore demand associated with different service-offering tuples from the candidate set of service offerings 210. The planning framework 265 begins with the candidate set of service offerings 210 and corresponding models 220. The demand learning phase 290 includes one or more decision points 305.

Figure 4:
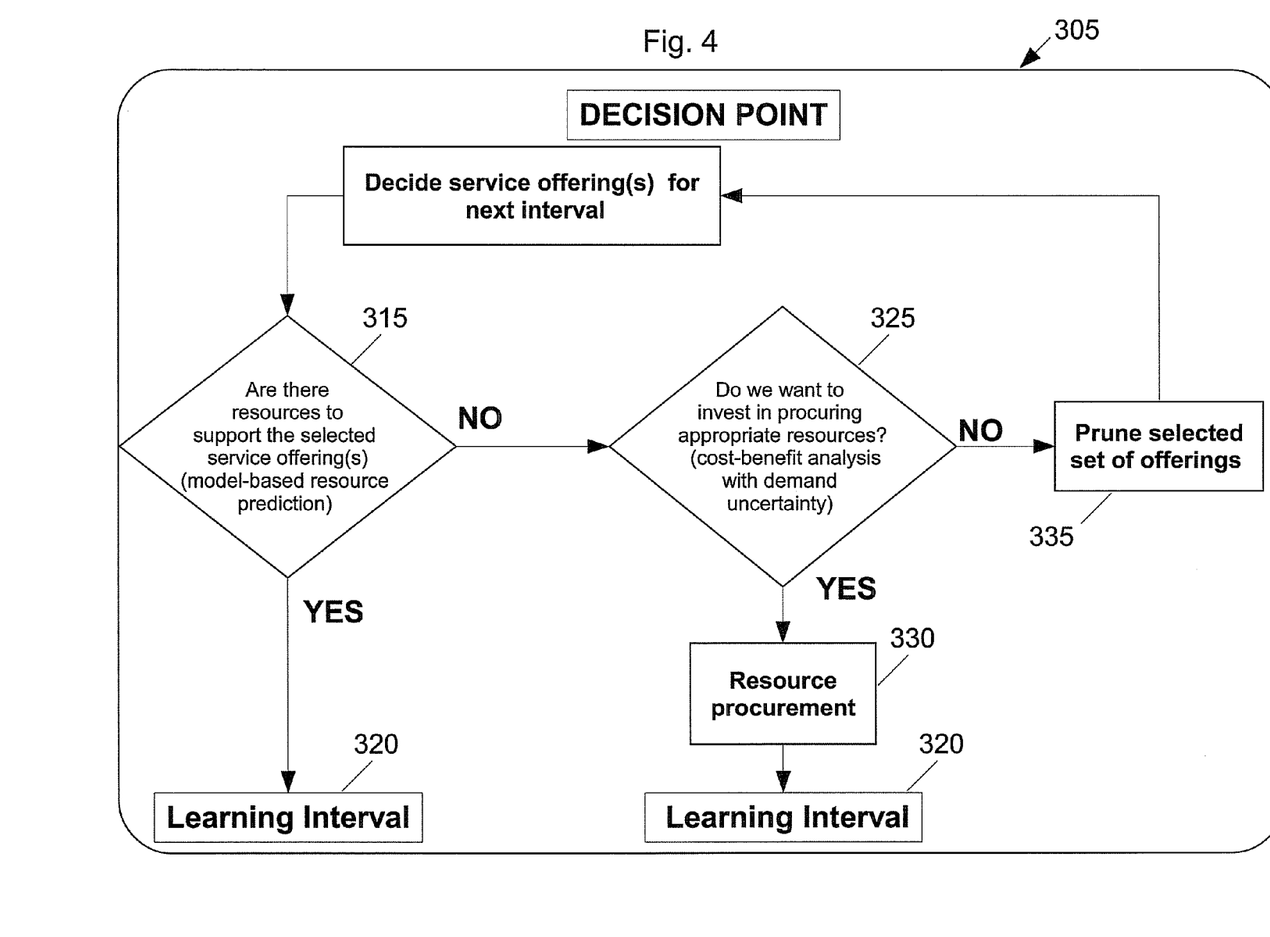
FIG. 4 illustrates one example of a flowchart of process steps of a decision point in accordance with an embodiment of the invention.

FIG. 4 depicts a flowchart of process steps of the decision point 305. At an initial decision point 305, the feasible set of service offerings 310 (see FIG. 3) is selected and includes the candidate set of service offerings 210. At subsequent decision points 305, the company prunes, or removes service offerings from the feasible set of service offerings 310 (that initially incorporates the candidate set of offerings 210) thereby redefining the feasible set of service offerings 310 as a subset of the candidate set of offerings 210, absent the pruned service offerings.

Providing each service offering of the feasible set of service offerings 310 requires company resources, for which there is invariably a cost. Accordingly, it may occur that the company's present resources are insufficient to support the selected feasible set of service offerings 310. Decision block 315 utilizes a resource prediction algorithm (e.g., model-based prediction algorithm) to determine if there are enough resources available internally to support the selected feasible set of service offerings 310. If there are sufficient resources available, the decision point 305 proceeds to a learning interval 320, as will be described further below. If there are not sufficient resources available, the selected feasible set of service offerings 310 requires additional resources, and the process continues to decision block 325.

Decision block 325 depicts a cost-benefit analysis to determine if it is beneficial for the company to invest in the additional resources for the selected feasible set of service offerings 310 to learn more about the corresponding demand. Because the framework 265 is still within the learning phase 290, (with the desired output of an enhanced demand estimate), any cost-benefit analyses are based on estimates of demand learned up to this point, which may require further refinement. Therefore, the cost-benefit analysis at decision block 325 shall be robust enough to account for these discrepancies or uncertainties between true and estimated demand.

If the company decides to offer this selected feasible set of service offerings 310, the decision point 305 proceeds to step 330, in which it purchases the resources needed for the selected feasible set of service offerings 310 to proceed to the learning interval 320. This may be achieved by short term leasing of those resources or by purchasing them on-demand for the next learning interval 320. Such short term leasing or on-demand purchase prevents a need for long term investments in resources, which may prove to be futile following subsequently refined demand estimates and corresponding appropriate selected sets of service offerings 310 to optimize business objectives.

Alternatively, if the company decides not to invest in resources and thus not to offer the full selected feasible set of service offerings 310 (for which it lacks required resources), the process continues to step 335. At step 335 the selected feasible set of service offerings 310 is pruned by removing at least one service offering from the set 310, and redefining the selected feasible set of service offerings 310 to be absent the removed service offering(s). Stated alternatively, the selected feasible set of service offerings 310 is pruned or reduced and redefined as being absent the pruned service offering, which thereby requires fewer resources. The process described above is repeated until the pruned, redefined feasible set of service offerings 310 matches the present resources as evaluated at decision block 315 or is determined to be worth investment by the cost-benefit analysis at decision block 325.

Referring back now to FIG. 3, following decision point 305, the demand learning phase 290 proceeds to the learning interval 320. At the learning interval 320, the company offers for sale to the market the selected feasible set of service offerings 310 and observes the market response, such as the purchasing actions of the market, to the selected feasible set of service offering(s) 310 offered for sale by the company. Each service offering is at a given price and service level. The process then proceeds to a demand update step 340. Observations made during the learning interval 320 are utilized to update beliefs about demand for different service offerings and the model 220 to be used in subsequent iterations.

Decision block 345 evaluates the differences between the observations made during the learning interval 320 and those predicted by the model 220. Stated alternatively, decision block 345 evaluates a value associated with the prior iteration of the demand learning phase 290 in terms of refinement of the model 220.

If it is determined that the difference between predictions made by the model 220 and observations made during the learning interval 320 of the prior iteration were significant, and that a subsequent iteration is likely to provide significant changes, decision block 345 continues the demand learning phase 290, and the process returns to decision point 305, using the updated beliefs from model 220 for another iteration of the demand learning phase 290.

Alternatively, if it is determined by decision block 345 that differences between predictions of the model 220 and observations made during the learning interval 320 of the prior iteration were insignificant relative to the resources utilized, and that a subsequent iteration is unlikely to provide significant changes, decision block 345 stops the demand learning phase 290, and the process continues to the decision phase 295.

At the conclusion of the demand learning phase 290, the company obtains useful estimates of demand associated with different feasible service-offerings. As described above, the set of feasible service offerings 310 is a subset of the set of candidate service offerings 210 that are identified before the demand learning phase 290 begins.

The decision phase 295 includes selection by the company of a preferred or desired set of service offering(s) 347 and offering for sale, to the market, the desired set of service offering(s) based on the learned estimates of demand resulting from the demand learning phase 290 and corresponding business objective estimates. The decision phase also includes long term investments, such as purchasing resources to support offering the desired set of service offerings 347.

The monitoring phase 300 includes observation of the market for factors that can potentially affect demand. At decision block 350, if such factors are not observed, the process returns to the decision phase 295 in which the company continues to offer the desired set of service offering(s) 347 previously selected. Alternatively, if such factors are observed, the process continues to block 355, in which the candidate set of service offerings 210 and prior beliefs about demand 215 are provided to the decision point 305, thereby initiating another iterative loop of the demand learning phase 290. Accordingly, the method can be adaptive and be implemented as an apparatus for dynamic demand learning, pricing and resource planning.

With reference to FIGS. 2 through 4, an example of implementation of an embodiment of the demand estimation process 200 is described below.

Consider an IT services company that is interested in estimating a demand of the market for IT services. The company intends to offer a new service, is interested in offering only one service offering at any given time. Because it is a new service, there is no competition in the market, and therefore competitor's offerings 245 are not considered. The company wants to explore all of the service offerings from the candidate set of service offerings 210, and therefore proceeds to invest in any necessary lacking resources via the resource procurements at Step 330 of the decision point 305 during the demand learning phase 290. Therefore, the feasible set of service offerings at the end of the demand learning phase 290 is same as the candidate set of service offerings 210 identified at the beginning of the demand learning phase 290. Stated alternatively, the process does not proceed from decision block 325 to step 335 and none of the service offerings of the selected set of service offerings 310 are pruned at Step 335 from the candidate set of service offerings 210.

Candidate Set of Service Offerings

The service level, or quality associated with the service is a delay experienced by the user in getting this service. For example, M is a vector representing the candidate set of service offerings 210 and is defined by:

$$M = \{(p_1, d_1), \ldots, (p_M, d_M)\} \quad \text{(equation-1)}$$

where p represents the price of the specific offering of the candidate set of service offerings 210 having M service offerings, and d represents a delay, or level of quality associated with the specific offering of the candidate set of service offerings 210 having M service offerings. Each service offering $(p_m, d_m)$ of the candidate set of service offerings 210, where $m=1 \ldots M$ has an associated actual demand $\Pi_m$. $\Pi_m$ represents a fraction of customers that will take the associated service offering $(p_m, d_m)$ if it is offered in the market. Therefore, a value of $\Pi_m$ is between 0 and 1.

Prior Beliefs about Demand

Because the true value of $\Pi_m$ is not known a priori, prior beliefs about demand are obtained using techniques such as historical data from other related services, market surveys, and expert opinions, for example. The prior belief about $\Pi_m$ is characterized as a probability distribution over the set [0,1]. For example, $f_0^{\Pi_m}(x)$ is the belief that the true value of $\Pi_m$ is x at the beginning of the demand learning phase 290.

Service Model

The service model relating service level (delay) as a function of demand and capacity is described by $$d_m = 1/(\mu c_m - \Pi_m) \quad \text{(equation-2)}$$

where $c_m$ is the capacity required by the company to support service offering $(p_m, d_m)$ and $1/\mu$ represents the average resource requirement of a service request. It will be appreciated that Equation-2 follows from modeling the IT services as a queue and using a standard queuing formula for the expected delay. Equation-2 can be mathematically rearranged to yield:

$$c_m \left( \frac{1}{d_m} + \prod_m \right) \frac{1}{\mu}. \quad \text{(equation-3)}$$

Demand Learning Phase

One possible method to efficiently explore demand in this phase is to model the problem of selecting the service offerings to offer at decision points 305 as a dynamic programming with Bayesian learning.

For example, a state is associated with each service offering of the candidate set of service offerings 210. Accordingly, the state of the system is the set of states of all these states. For example, let $\{s_0^m, m=1, \ldots, M\}$ be the state at the beginning of the demand learning phase 290 and it is decided to offer service offering m in the learning interval 320 between decision point 0 and 1. In response to this choice, the new state at decision point 1 is $\{s_1^m, m=1, \ldots, M\}$. Based on the observations of the learning interval 320 and the new state, the beliefs about $\Pi_m$, $m=1, \ldots, M$ are updated by the demand update at block 340 to $f_1^{\Pi_m}(x)$. These therefore become the new estimates for demand. It will be appreciated that an exemplary manner to update the beliefs about demand at each decision point 305 is through the use of Bayesian learning approach.

A reward, such as a factor of the business objectives for example, is associated with each choice made for a learning interval. The reward depends upon the state of the system at the start of learning interval and the service offering choice made for the interval. For example, if at the start of the learning interval between decision points n and n+1 for some $n=1, 2, \ldots$, the system state is $\{s_n^m, m=1, \ldots, M\}$ and the decision made at decision point n is to offer service offering m in this interval then the reward is described by:

$$r(s, m) = \int_0^1 \left( \prod_m p_m - \alpha_m c_m \right) f_n^{\Pi_m} (\prod_m) d \prod_m \quad \text{(equation-4)}$$

where $\alpha_m$ is the per unit capacity cost to the company and $c_m$ is given by equation-3. Accordingly, the reward is a measure of the expected revenue obtained if the company decides to offer service offering m. It will be appreciated that this is not the same as the true value of the expected revenue with service offering m as the demand is not known exactly. Different techniques can be applied to solve this dynamic programming problem including, but not limited to, value iteration, policy iteration, reinforcement learning, and Gittin's index.

After a sufficiently good estimate of demand associated with a service offering is obtained, the company can decide at decision block 345 to stop the demand learning phase 290 for this particular service offering. The decision at block 345 can be based on a stopping criterion, which can be same or different for all or a subset of service offerings. An example criterion can be to stop the demand learning phase 290 for a service offering after that service offering is offered some N number of times.

Decision Phase $\{\hat{f}^{\Pi_m}, m=1, \ldots, M\}$ describes the set of learned estimates of demand for the feasible set of service offerings at the conclusion of the demand learning phase 290. The company chooses a preferred service offering based upon the estimated demand $\{\hat{f}^{\Pi_m}, m=1, \ldots, M\}$, to achieve business objectives such as to maximize revenue. The preferred service offering is determined by solution of the following optimization problem:

$$\underset{m \in \{1,\ldots,M\}}{\arg\max} \int_0^1 \left( \prod_m p_m - \alpha_m \left( \frac{1}{d_m} + \prod_m \right) \frac{1}{\mu} \right) \hat{f}^{\Pi_m} (\prod_m) d \prod_m \quad \text{(expression-1)}$$

wherein:

m represents an index value of a specific service offering of the set of feasible service offerings;

$\Pi_m$ represents an actual demand corresponding to the specific service offering;

$p_m$ represents a price corresponding to the specific service offering;

$\alpha_m$ represents a per unit capacity cost corresponding to the specific service offering;

$d_m$ represents a service level corresponding to the specific service offering;

$1/\mu$ represents an average resource requirement of a service request; and $\hat{f}^{\Pi_m}$ represents an estimated demand corresponding to the specific service offering.

If m* is the preferred service offering which is the solution to the above optimization problem, the company can decide to maintain a capacity described by:

$$c_{m^*} = \left( \frac{1}{d_{m^*}} + \int_0^1 \prod_{m^*} \hat{f}^{\Pi_{m^*}} (\pi_{m^*}) d \prod_{m^*} \right) \frac{1}{\mu}. \quad \text{(equation-5)}$$

wherein:

m* represents an index value of the preferred service offering;

$c_{m^*}$ represents a service capacity corresponding to the preferred service offering;

$d_{m^*}$ represents a service level corresponding to the preferred service offering;

$\Pi_{m^*}$ represents an actual demand corresponding to the preferred service offering;

$\hat{f}^{\Pi_{m^*}}$ represents an estimated demand corresponding to the preferred service level; and $1/\mu$ represents an average resource requirement of a service request.

With reference to FIGS. 2-4, FIG. 5 depicts a flowchart 400 of process steps of an embodiment of a method for estimating demand of a market for a service.

Figure 5:
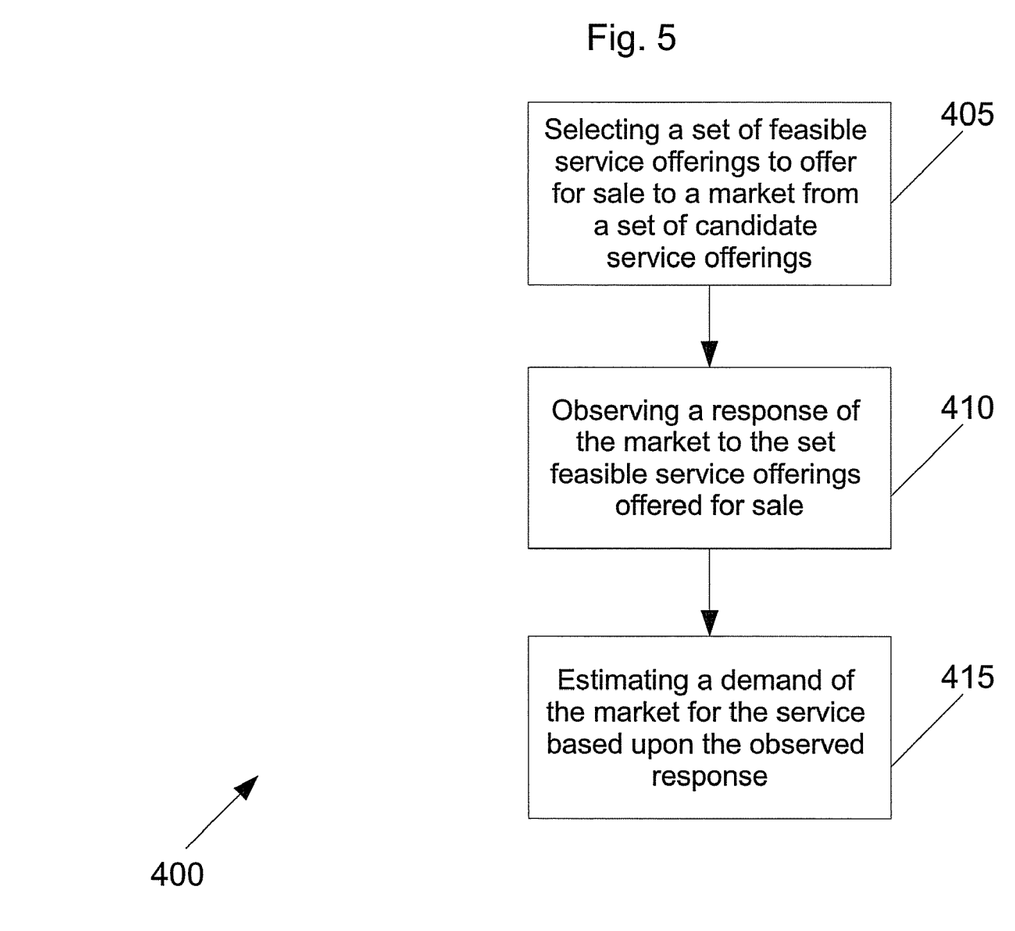
FIG. 5 illustrates one example of a flowchart of process steps of a method to estimate demand of a market for a service in accordance with an embodiment of the invention.

The method begins at step 405 including selecting the set of feasible service offerings 310 to offer for sale to the market from the set of candidate service offerings 210, each service offering of the set of feasible service offerings 310 and the set of candidate service offerings 210 defined by price 230 and service level 225. The method proceeds to step 410 including observing a response of the market to the set feasible service offerings 310 offered for sale. Step 415 includes estimating a demand of the market for the service based upon the observed response. In one embodiment, the method concludes with recording the estimated display upon a storage device, such as the mass storage 104. In another embodiment, the method further includes displaying the estimated demand via the display screen 115 (FIG. 1).

In an embodiment, the method further includes updating the model 200 linking a service offering of the set of feasible service offerings 310 to the estimated demand of the market based upon response observed at step 410.

In another embodiment, the selecting the set of feasible service offerings 310 at step 405 includes initially defining the set of feasible service offerings 310 as the set of candidate service offerings 210 and determining whether to invest resources to offer the set of feasible service offerings to the market for sale at decision block 325. In response to determining not to invest resources, process block 335 includes removing at least one service offering from the set of feasible service offerings 310, thereby redefining the set of feasible service offerings 310 as being absent the removed at least one service offering.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method to estimate demand of a market for a service, the method comprising:

selecting, with a computing device, a set of feasible service offerings to offer for sale to the market from a set of candidate service offerings, each service offering of the set of feasible service offerings and the set of candidate service offerings defined by a price and a service level;

observing, with the computing device, a response of the market to the set of feasible service offerings offered for sale; and estimating, with the computing device, a demand of the market for the service based upon the observed response, using a Bayesian learning approach.

2. The method of claim 1, further comprising:
updating a model linking a service offering of the set of feasible service offerings to the estimated demand of the market based upon the observed response.

3. The method of claim 1, wherein the selecting comprises:
defining the set of feasible service offerings as the set of candidate service offerings;
determining whether to invest resources to offer the set of feasible service offerings to the market for sale;
in response to determining not to invest resources:
removing at least one service offering from the set of feasible service offerings; and
redefining the set of feasible service offerings as being absent the removed at least one service offering.

4. The method of claim 1, wherein the service level comprises a quality level of service.

5. The method of claim 1, wherein:
the demand comprises the demand of the market for information technology services; and
the estimating comprises estimating a demand of the market for the information technology services.

6. The method of claim 1, further comprising:
determining a preferred service offering to achieve business objectives based upon the estimated demand.

7. The method of claim 6, wherein the determining comprises evaluating an expression:

$$\arg\max_{m \in \{1,\ldots,M\}} \int_0^1 \left( \prod_m p_m - \alpha_m \left( \frac{1}{d_m} + \prod_m \right) \frac{1}{\mu} \right) \bar{f}^{\Pi_m}(\prod_m) d\prod_m$$

wherein:
m represents an index value of a specific service offering of the set of feasible service offerings;
$\Pi_m$ represents an actual demand corresponding to the specific service offering;
$p_m$ represents a price corresponding to the specific service offering;
$\alpha_m$ represents a per unit capacity cost corresponding to the specific service offering;
$d_m$ represents a service level corresponding to the specific service offering;
$1/\mu$ represents an average resource requirement of a service request; and
$\bar{f}^{\Pi_m}$ represents an estimated demand corresponding to the specific service offering.

8. The method of claim 6, further comprising:
selecting a service capacity based upon evaluating an equation:

$$c_{m^*} = \left( \frac{1}{d_{m^*}} + \int_0^1 \prod_{m^*} \bar{f}^{\Pi_{m^*}}(\pi_{m^*}) d\prod_{m^*} \right) \frac{1}{\mu}$$

wherein:
m* represents an index value of the preferred service offering;
$c_{m^*}$ represents a service capacity corresponding to the preferred service offering;
$d_{m^*}$ represents a service level corresponding to the preferred service offering;
$\Pi_{m^*}$ represents an actual demand corresponding to the preferred service offering;
$\bar{f}^{\Pi_m*}$ represents an estimated demand corresponding to the preferred service level; and
$1/\mu$ represents an average resource requirement of a service request.

9. A computer program product stored on computer readable media and comprising computer executable instructions for estimating demand of a market for a service, the product comprising instructions for:

selecting, with a computing device, a set of feasible service offerings to offer for sale to the market from a set of candidate service offerings, each service offering of the set of feasible service offerings and the set of candidate service offerings defined by a price and a service level;

observing, with the computing device, a response of the market to the offered set of feasible service offerings; and estimating, with the computing device, a demand of the market for the service based upon the observed response, using a Bayesian learning approach.

10. The computer program product of claim 9, further comprising instructions for:
updating a model linking a service offering of the set of feasible service offerings to the estimated demand of the market based upon the observed response.

11. The computer program product of claim 9, wherein the selecting comprises:
defining the set of feasible service offerings as the set of candidate service offerings;
determining whether to invest resources to offer the set of feasible service offerings to the market for sale;
in response to determining not to invest resources:
removing at least one service offering from the set of feasible service offerings; and
redefining the set of feasible service offerings as being absent the removed at least one service offering.

12. The computer program product of claim 9, wherein the service level comprises a quality level of service.

13. The computer program product of claim 9, wherein:
the demand comprises the demand of the market for information technology services; and
the estimating comprises estimating a demand of the market for the information technology services.

14. The computer program product of claim 9, further comprising instructions for:
determining a preferred service offering to achieve business objectives based upon the estimated demand.

15. The computer program product of claim 14, wherein the instructions for determining comprise instructions for evaluating an expression:

$$\arg\max_{m \in \{1,\ldots,M\}} \int_0^1 \left( \prod_m p_m - \alpha_m \left( \frac{1}{d_m} + \prod_m \right) \frac{1}{\mu} \right) \bar{f}^{\Pi_m}(\prod_m) d\prod_m$$

wherein:

m represents an index value of a specific service offering of the set of feasible service offerings;

$\Pi_m$ represents an actual demand corresponding to the specific service offering;

$p_m$ represents a price corresponding to the specific service offering;

$\alpha_m$ represents a per unit capacity cost corresponding to the specific service offering;

$d_m$ represents a service level corresponding to the specific service offering;

$1/\mu$ represents an average resource requirement of a service request;

$\bar{f}^{\Pi_m}$ represents an estimated demand corresponding to the specific service offering.

16. The computer program product of claim 14, further comprising instructions for selecting a service capacity based upon evaluating an equation:

$$c_{m^*} = \left( \frac{1}{d_{m^*}} + \int_0^1 \prod_{m^*} \bar{f}^{\Pi_{m^*}}(\pi_{m^*}) d\prod_{m^*} \right) \frac{1}{\mu}$$

wherein:

m* represents an index value of the preferred service offering;

$c_{m^*}$ represents a service capacity corresponding to the preferred service offering;

$d_{m^*}$ represents a service level corresponding to the preferred service offering;

$\Pi_{m^*}$ represents an actual demand corresponding to the preferred service offering;

$\bar{f}^{\Pi_{m^*}}$ represents an estimated demand corresponding to the preferred service level; and $1/\mu$ represents an average resource requirement of a service request.

17. A system for estimating demand of a market for a service, the system comprising:

for a processing device configured to:

select a set of feasible service offerings to offer for sale to the market from a set of candidate service offerings, each service offering of the set of feasible service offerings and the set of candidate service offerings defined by a price and a service level;

observe a response of the market to the offered set of feasible service offerings; and estimate a demand of the market for the service based upon the observed response, using a Bayesian learning approach.

18. The system of claim 17, wherein the processing device is further configured to:

define the set of feasible service offerings as the set of candidate service offerings;

determine whether to invest resources to offer the set of feasible service offerings to the market for sale;

in response to determining not to invest resources:

remove at least one service offering from the set of feasible service offerings; and redefine the set of feasible service offerings as being absent the removed at least one service offering.

* * * * *